Dec. 20, 1938.  B. GIUNTINI  2,140,740
MEASURING APPARATUS FOR BOOT AND SHOE MAKERS
Filed Oct. 21, 1936  5 Sheets-Sheet 1

INVENTOR:
BRUNO GIUNTINI
BY: Francis E. Boyer
ATTORNEY

Dec. 20, 1938.  B. GIUNTINI  2,140,740
MEASURING APPARATUS FOR BOOT AND SHOE MAKERS
Filed Oct. 21, 1936  5 Sheets-Sheet 2

INVENTOR:
BRUNO GIUNTINI

BY: Francis E. Boyce
ATTORNEY

Dec. 20, 1938. B. GIUNTINI 2,140,740
MEASURING APPARATUS FOR BOOT AND SHOE MAKERS
Filed Oct. 21, 1936 5 Sheets-Sheet 4
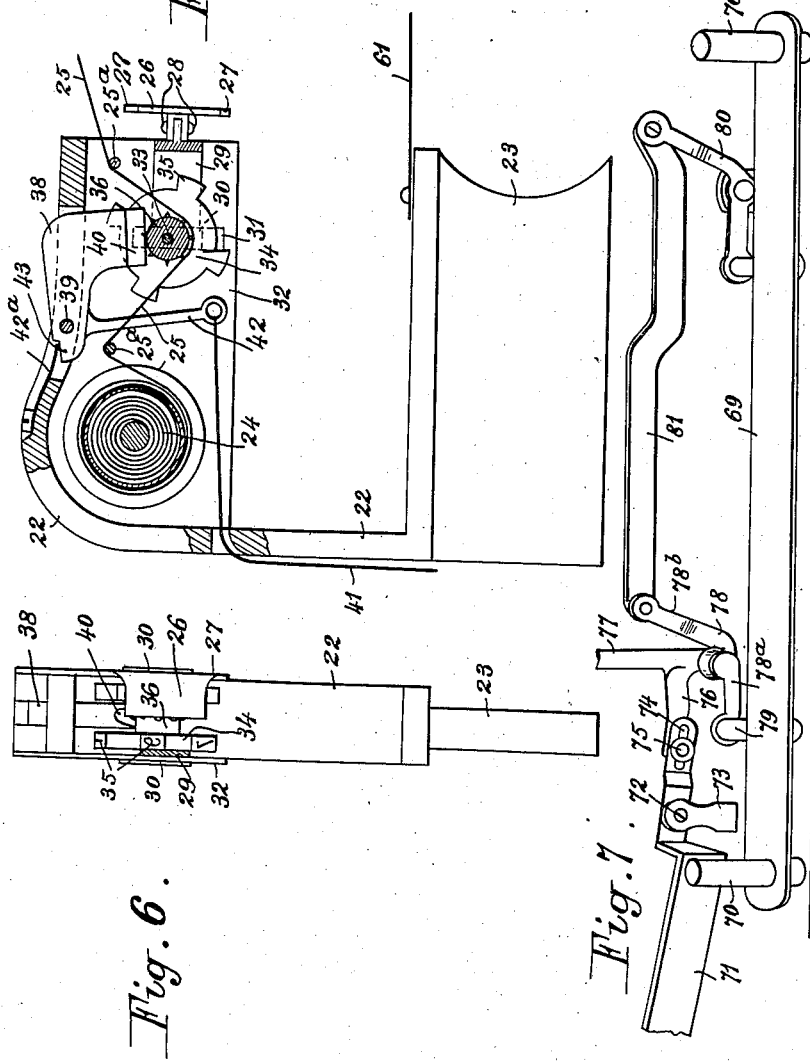
INVENTOR:
BRUNO GIUNTINI
BY: Francis E. Boyce
ATTORNEY Dec. 20, 1938.  B. GIUNTINI  2,140,740
MEASURING APPARATUS FOR BOOT AND SHOE MAKERS
Filed Oct. 21, 1936   5 Sheets-Sheet 5

INVENTOR:
BRUNO GIUNTINI
BY: Francis E. Boyce
ATTORNEY

Patented Dec. 20, 1938

2,140,740

UNITED STATES PATENT OFFICE 2,140,740

MEASURING APPARATUS FOR BOOT AND SHOE MAKERS

Bruno Giuntini, Alger, France

Application October 21, 1936, Serial No. 106,808
In France October 26, 1935

7 Claims. (Cl. 33—3)

It has already been proposed, in particular in the French Patent No. 702,007, of September 15, 1930, to take measurements for the manufacture of boots and shoes, by means of apparatus comprising a number of graduated ribbons sliding in suitable buckles arranged along a line joining the toe portion of the foot to the heel and passing through the middle of the ankle.

Use has also been made of apparatus for obtaining exact contour of the foot as well as the various thicknesses of the latter.

The apparatus forming the subject-matter of the present invention has for its object automatically measuring and recording on a sheet of paper, arranged under the sole of the foot, the various widths and thicknesses of the latter. The distortions of the sole of the foot being also recorded on this sheet.

The present apparatus divides the measuring operation into three stages:

(1) Measurement of the sole of the foot.
(2) Measurement of the left-hand side of the foot.
(3) Measurement of the right-hand side of the foot.

For taking these two latter measurements, a vertical plane separating the foot in two and passing through the middle of the toe and heel portions of the foot, as well as through the center of the periphery of the ankle, is chosen as a median or reference plane.

This apparatus effects the exact taking of the different measurements of the foot at the necessary places, after the heel has been placed at the desired level, these measurements exactly corresponding to the shape of the foot.

An apparatus for taking measurements in accordance with the invention is illustrated in the accompanying drawings, in which:

Figs. 5 and 6 are respectively a longitudinal section and an end view, partly in section, of a slide-block for obtaining the contour of the foot and the thickness of the latter.

Fig. 7 is a perspective view showing the device for recording the various measurements.

Figure 1:
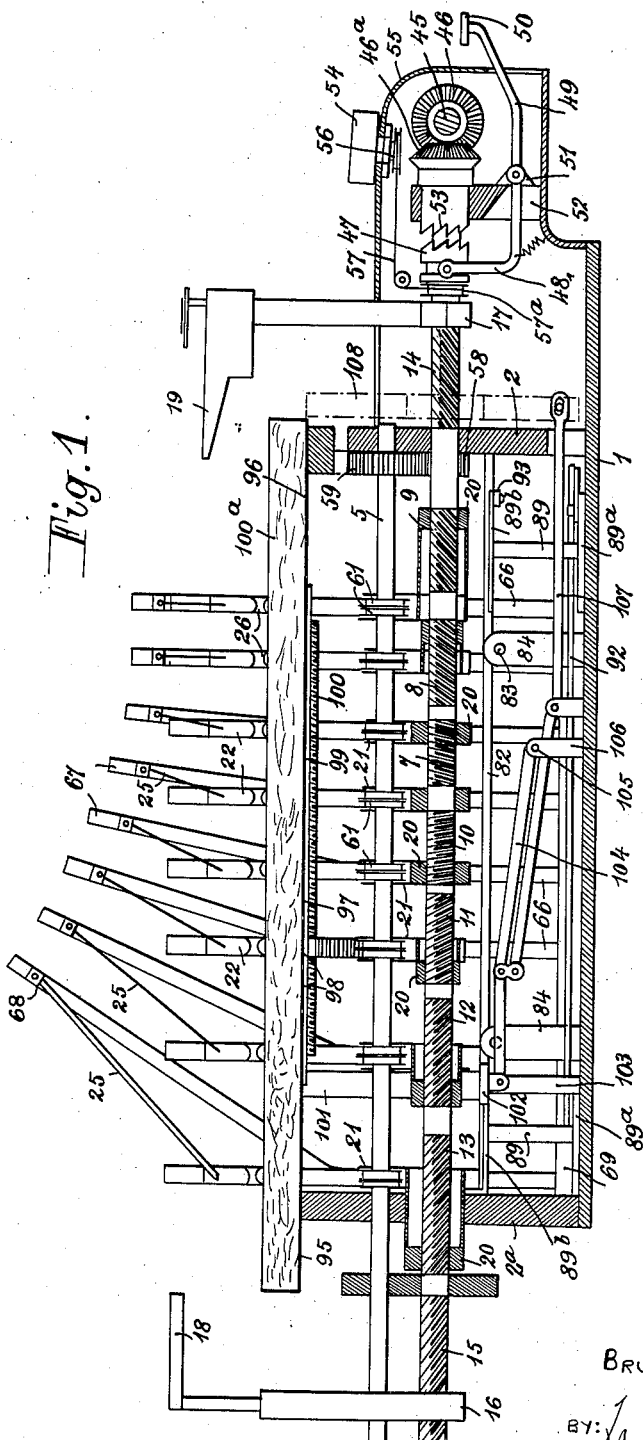
Fig. 1 is a longitudinal section of the apparatus.
Figure 2:
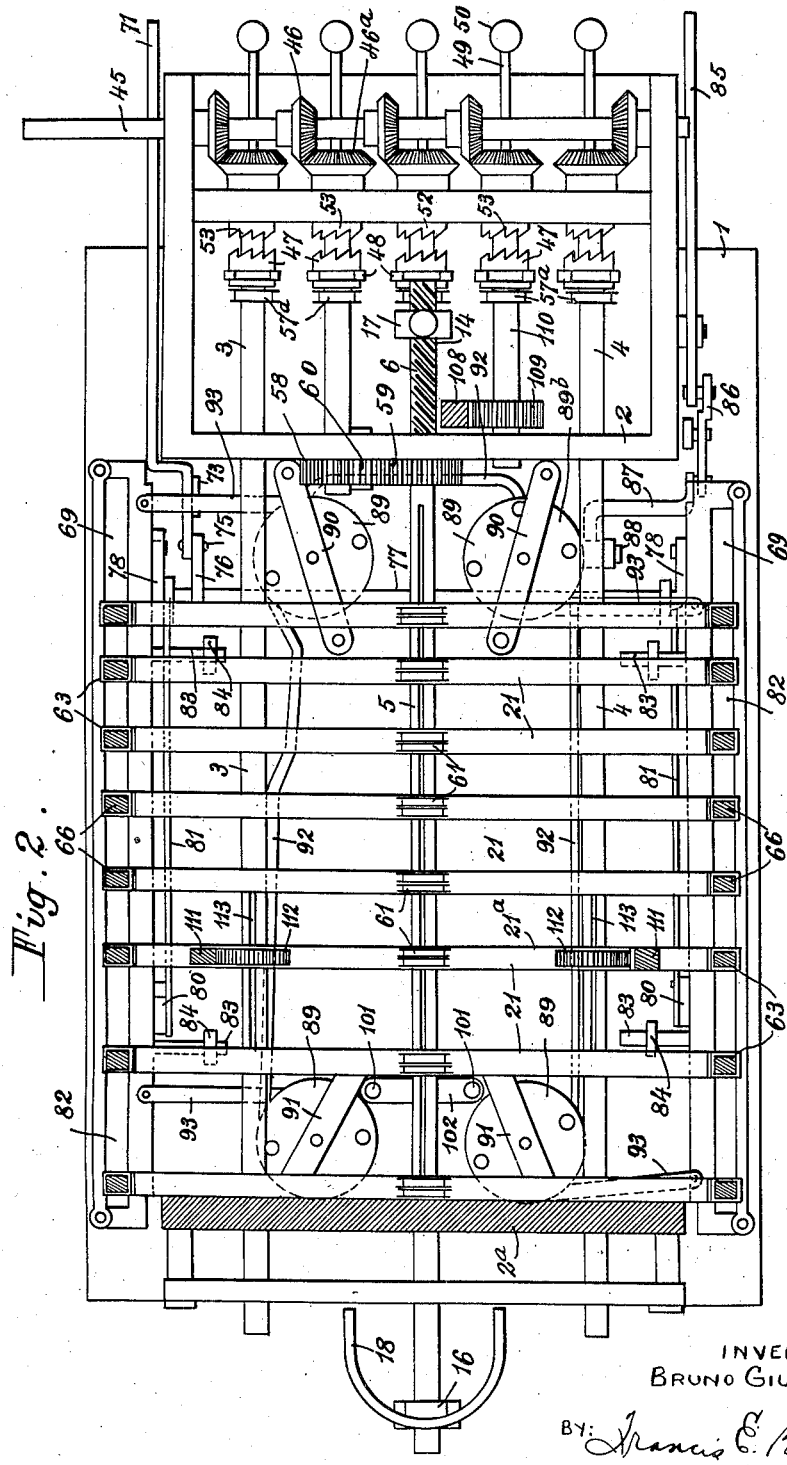
Fig. 2 is a horizontal section taken under the plane of the sole of the foot.
Figure 3:
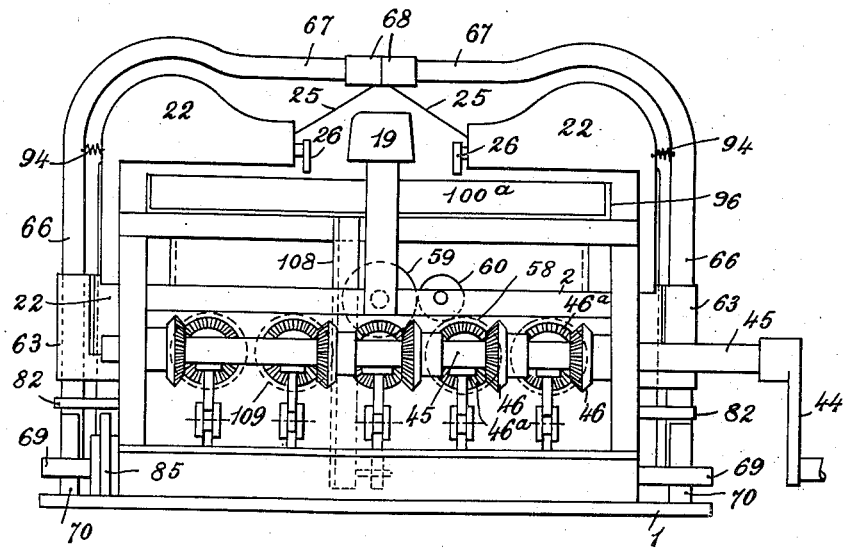
Fig. 3 is an end view of the apparatus.

According to the invention, the apparatus comprises a frame constituted by a base 1, provided with two parallel walls 2 and 2a, arranged at the front and at the rear of the base. These walls 2 and 2a serve as supports for shafts 3, 4, 5 and for a shaft 6 on which screw-threaded portions are provided. On the shaft 6 are portions 7, 8, 9 which have right-hand screw-threads of different pitches and portions 10, 11, 12, 13 which have left-hand screw-threads, also of different pitches. These different pitches are determined by the different distances through which the measurement-taking members are to move. The extreme portions 14, 15 of shaft 6 are also screw-threaded for receiving nuts 16, 17 rigid with abutments 18 and 19 for the heel and toe portions of the foot.

On each screw-threaded portion is screwed a split nut 20 adapted to actuate a frame 21 carrying the members used for taking the contour and thickness of the foot.

Figure 4:
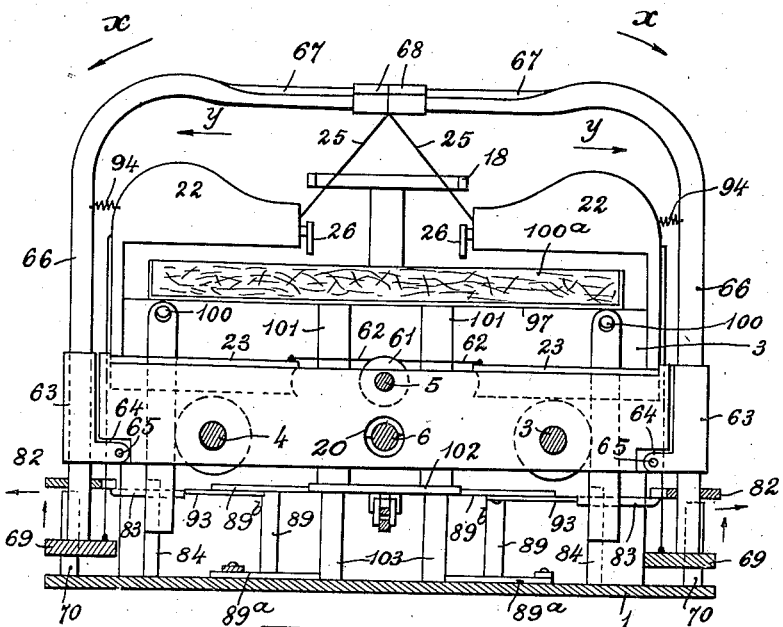
Fig. 4 is a cross section of the apparatus.
Figure 8:
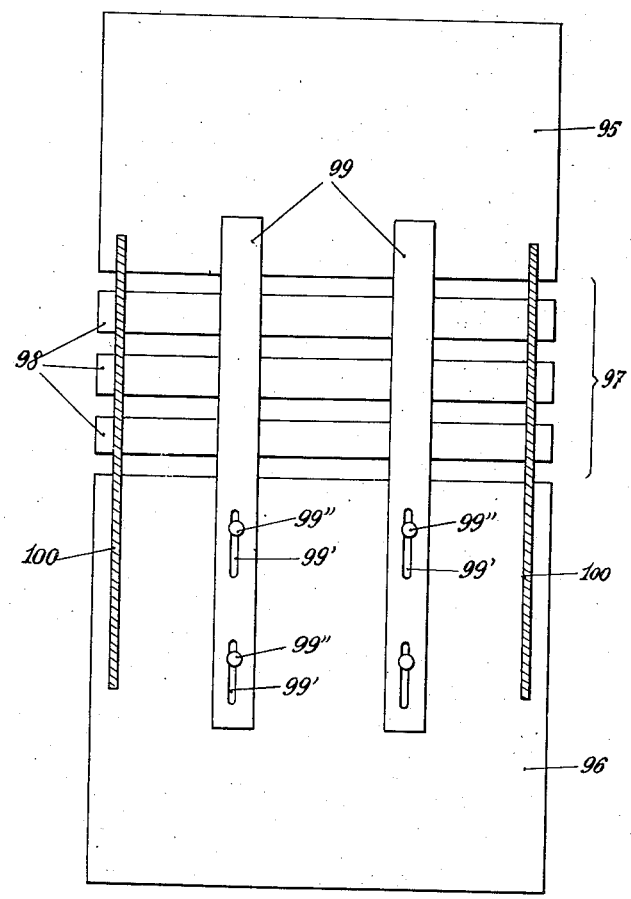
Fig. 8 is a partly sectional plan view of the foot support removed from the rest of the apparatus.

Each of these members is formed by two U-shaped elements 22 (Figs. 4, 5, 6) arranged opposite each other and the lower portions 23 of which, acting as guides, simultaneously slide in the respective frame 21 under the action of a suitable control device which will be described hereinafter. The upper portion of each member 22 is recessed for receiving: at one side, a spring barrel 24 about which is wound a ribbon 25, passing over guides 25a and adapted to exactly take the thickness of the foot and, at the other side, a device adapted to indicate the measurement of the latter. This latter device comprises a small plate 26 serving as an abutment and provided with two points 27. This plate is pivoted, as at 28, to a bridge 29, which is secured on two slide-blocks 30 arranged in grooves 31 provided in the cheek members 32 of the element 22. These slide-blocks 30 serve as a support for a shaft 33 on which is rotatably mounted a drum 34 bearing, engraved on wings 35, the graduations for taking the measurements.

The ribbon 25 is trained around the hub 36 of the drum 34 and this hub is provided with pins 37 preventing slipping of the ribbon 25, which is to drive said drum during its displacement.

Means are provided for lowering the drum 34 and plate 26 when it is desired to record the measurement.

This device consists of a lever 38 which rocks upon a pin 39, carried by the upper part of member 22. This lever is provided with a fork-piece 40 which acts on the hub 36 of drum 34 when an arm 42, rigid with the lever 38, is actuated through a cable 41. A spring 42a, acting on a finger 43, serves to hold the lever 38 in its normal position.

The shafts 3, 4 and 6 are arranged to be actuated by means of a crank 44 secured on the end of a shaft 45, arranged at right angles to said shafts 3, 4, and 6, through bevel pinions 46, 46a, constantly meshing with each other.

For selectively actuating one of the shafts, shaft 6 for instance, a clutch member 47 (Fig. 1) is engaged by a shipper fork 48 controlled by a lever 49, provided with an operating knob 50. This lever is pivoted on a pin fixed in a support 51 secured on a cross member 52 serving as a bearing for the hubs of the bevel pinions 46a. Each of the hubs of pinions 46a terminates in a clutch member 53 with which clutch member 47 engages.

During the movement of crank 44, the lever 49 for the shaft 3, 4, or 6 to be actuated is held in depressed position to effect engagement of clutch members 47, 53 for the respective shaft.

The extent of rotation of the selected shaft is automatically measured by a recorder 54, secured on the gear casing 55. The recorder index is driven by a pulley 56 actuated, by means of a belt 57, from a pulley 57a fast on the shaft.

Shaft 5 is actuated by a similar device, arranged above shaft 6; the transmission being effected through a set of pinions 58, 59, meshing through an intermediate pinion 60.

Shaft 5 is splined throughout its length in order to drive drums 61, arranged in groups of two in each frame 21. On these drums wind ribbons 62 (Fig. 4), moving the members 22 adapted to take the contour of the foot.

On each side of the frames 21 are provided slides 63, which are pivoted, at their lower parts, on pins 65 passing through bifurcations 64 formed in the lower parts of said slides 63.

In these slides extend the vertical rods 66 of members 67 passing above the foot, for taking the thicknesses of the latter by means of the ribbons 25 which are secured on the ends 68 of said members.

The rods 66 pass through the slides 63 and rest on small bars 69, arranged on either side of the apparatus. These bars 69 are vertically movable on guides 70, when a lever 71, arranged on the right-hand side of the apparatus (Fig. 7), is acted upon.

The lever 71 is supported by a pin 72 fixed in a fork 73, mounted on the base 1; its end is provided with a slot 74 through which passes a pin 75 carried by the end of an arm 76, integral with a shaft 77 actuating the devices for moving the bars 69 vertically. These devices consist of bell crank levers 78, rigidly secured on the ends of shaft 77. One of the arms 78a of each lever 78 carries a pin 79 projecting from the respective bar 69, and the other arm 78b transmits the movement to a similar lever 80 by means of a link 81. The levers 80 act in the same way as the levers 78. These two levers simultaneously actuate the bars 69 in order to keep them horizontal during their vertical displacement.

The rods 66 pass through guides 82 held in position by rods 83 supported by posts 84 in which they slide when the members 67 are caused to rock for allowing the foot to be placed in position. The rocking movement of members 67 is effected by means of a lever 85, arranged on the left-hand side of the apparatus and acting, through a lever 86, on a crank 87, carried by a finger 88, fixed to the device causing the rocking movement.

This device comprises drums 89 the pins of which pivot, below, in the base 1 and above in supports 90, 91. The lower cheek members 89a of the drums 89 are connected together by links 92 in order that the angular movement imparted to the drum carrying the finger 88 will be transmitted to the other drums. Links 95, pivotally connected to upper cheek members 89b, connect these latter to the guides 82.

When lever 85 is acted upon, an angular movement is imparted to the first drum which, through the links 92, transmits the same movement to the other drums.

Under the action of the angular movement, the links 93 act either for pulling, or for pushing back the guides 82, thus causing the rods 66 to rock about the pins 65 of slides 63.

The rocking movement separating the members 67 apart is transmitted to the members 22 by springs 94.

The base of the apparatus on which is placed the sole of the foot is formed of three parts; two rigid parts 95, 96 corresponding to the heel and toe portions of the foot, and a distortable part 97 which is composed of transverse blades 98 supported by longitudinal blades 99. Springs 100 connect these three parts.

This base is covered with a carpet 100a, made of felt or preferably of spongy rubber, having a great resiliency.

The part 95, corresponding to the heel, is adapted to be lifted by means of two tubular rods 101, resting on a small table 102. This table 102 is guided in its vertical displacements by rods 103 fixed on the base 1.

A lever 104, pivoted under the table 102 on a pin 105 carried by a support 106, is actuated by a lever 107, which is in turn actuated by a rack 108. This rack meshes with a pinion 109, fast on a shaft 110 which is driven in the same manner as shaft 6.

The right and left hand ends of the distortable part 97 can each be lifted, according to the height of the arch of the foot, by means of racks 111 meshing with pinions 112, arranged in a frame 21a and actuated by shafts 3 and 4, being splined thereon by the spline slots 113. These shafts are actuated, as shaft 6, by means of the crank 44.

The ribbons 41 of the members 22 are secured on the small bars 69, in order that, upon actuation of the latter, the drums 34 as well as the abutments 26 will be lowered for marking the positions of the latter and the indications carried by the wings 35 of the drums in contact with a sheet of paper placed on the base.

For taking the measurements of a foot, the following mode of procedure is adopted:

The members 67 are first lifted by acting on lever 71, this moving the bars 69 vertically and causing the ribbons 25 to unwind from the barrels 24. The carpet 100a is then exposed by causing the members 67 to rock by means of lever 85 and drums 89, which, through the links 93, exert a pull on guides 82. The latter, acting on the rods 66, cause the slides 63 to pivot about the pins 65 in the direction of the arrow $x$. The members 67 being connected to the members 22 by springs 94 cause these members 22 to slide in the frames 21 in the direction of the arrow $y$ in order to expose the carpet 100a.

As many sheets of paper as desired are placed on said carpet, by interposing, between them, sheets of carbon paper.

The foot is then placed on these sheets and by pressing it upon the carpet 100a, the various distortions of the sole of the foot are inscribed. Shaft 6 is then engaged by acting on the corresponding operating knob 50, arranged at the front of the apparatus, and the crank 44 is rotated.

The movement of the crank causes the rotation of shaft 6 which, by its various screw-threaded portions, moves:

(a) The abutments of the heel and toe portions of the foot, (b) The several frames 21, which assume an exact position as well as members 22 and 67; the positions are recorded by the index of the corresponding recorder.

The knob 50 corresponding to shaft 6 is released and that placed opposite shaft 110 is then acted upon. The movement of rotation of the crank is transmitted to the pinion 109, which moves the rack 108 downwardly, by imparting to lever 107 a rocking movement lifting the lever 104 and table 102. The latter, through the tubular rods 101, lifts the part 95 and the heel to the desired level, and this level is recorded by the indicator controlled by shaft 110.

The level of the heel being determined, the part 97 is distorted by means of shaft 4 if the measurements of the right foot are taken, in order to exactly take the height of the camber of the arch of the foot. This operation is effected by acting on the knob 50 arranged opposite shaft 4. This shaft, by rotating, drives pinion 112 which moves the rack 111 acting on the ends of the distortable blades 98 which firmly press the carpet 100a against the arch of the foot. The indications are also recorded by the index of the recorder.

The knob 50 arranged opposite the shaft actuating, through pinions 58, 59, 60, the shaft 5, is then acted upon. By rotating, this shaft 5 winds on the drums 61, the ribbons 62 for moving the members 22 towards each other. This movement is continued until all the abutments 26 are in contact with the foot; the members 67 are slightly moved by the springs 94. The foot being surrounded by the abutments 26, the lever 85 is then acted upon for causing the members 67 to rock about the pins 65 in a direction reverse to that indicated by the arrows $x$, so that the ends 68 come in contact and that the ribbons 25 come above the foot.

For inscribing the contour, as well as the various thicknesses of the foot on the sheets placed on the carpet 100a which will properly determine the shape of the wooden boot last, the lever 71 is again acted upon for lowering the bars 69 on which rest the rods 66 and the attaching members of the cables 41.

In the lowering movement of the bars 69, the rods 66 and cables 41 follow the same movement, this causing the ribbons 25 to fit about the foot and the barrels 24 to wind up the excess length of ribbon by actuating the drums 34 and, subsequently, to lower the drums 34 as well as the abutments 26 in order that the indications carried by the wings 35 and the position of the points 27 shall be inscribed on the sheets of paper.

The measurements being taken, the lever 71 is operated for lifting the members 67, and for moving the members 22 apart and causing the members 67 to rock.

The central knob 50 is then depressed for engaging shaft 6 in order to separate the abutments of the heel and toe portions of the foot, by acting on the crank, for releasing the foot.

I claim:

1. An apparatus for taking measurements of the foot, for use by boot and shoe makers, comprising a support, movable means mounted thereon for engaging the foot lengthwise, for elevating the heel, and for engaging the arch, the outline and the upper part of the foot, actuating shafts operatively connected to said movable means, indicators connected to said actuating shafts and showing the actual positions of the movable means actuated by said actuating shafts, a driving shaft and transmissions rotatably mounted in said support and adapted to transmit rotation from said driving shaft to each of said actuating shafts, each of said transmissions including a normally disengaged clutch, and means for selectively engaging the said clutches.

2. An apparatus as claimed in claim 1, comprising an abutment for the heel, an abutment for the toe, said abutments being slidable in the longitudinal direction, screw-threaded portions provided on one of said actuating shafts and having inversely directed pitches, and a nut secured to each of said abutments and engaging one of said screw-threaded portions.

3. An apparatus as claimed in claim 1, comprising a plurality of frames supporting said means for engaging the outline and the upper part of the foot and mounted so as to be movable longitudinally, screw-threaded portions provided on one of said actuating shafts and having different pitches, and a nut secured to each of said frames and engaging one of said screw-threaded portions.

4. An apparatus as claimed in claim 1, comprising a sole plate including a vertically adjustable rear portion, a gear mounted on one of said actuating shafts, a rack meshing with said gear and transmission levers connecting said rack to the said rear portion of the sole plate and adapted to displace said portion vertically upon rotation of said gear.

5. An apparatus as claimed in claim 1, comprising a sole plate including a distortable portion, a vertically movable rack connected to each side of said distortable portion and gears mounted on two of the said actuating shafts, each of said racks engaging one of said gears.

6. An apparatus as claimed in claim 1, comprising a plurality of frames, means actuated by one of said actuating shafts for longitudinally displacing the said frames, curved members pivotally mounted on both sides of said frames and adapted to abut against one another by their inner ends in the middle plane of the apparatus, above the foot to be measured, means for lowering said curved members, a ribbon secured to each of said ends and means mounted on said frames for winding up said ribbons and for measuring their free length.

7. An apparatus as claimed in claim 1, comprising a plurality of frames, means actuated by one of said actuating shafts for longitudinally displacing the said frames, abutments laterally shiftable on said frames and adapted to engage the outline of the foot, points on the lower edge of said abutments and means for lowering said abutments so as to press said points into a sheet of paper placed below.

GIUNTINI, BRUNO.